F. E. BESSLER.
TIRE.
APPLICATION FILED FEB. 6, 1920.

1,414,544.

Patented May 2, 1922.

Inventor
F. E. Bessler,
By C. A. Snow & Co.
Attorneys.

Witness

UNITED STATES PATENT OFFICE.

FRANK E. BESSLER, OF AKRON, OHIO, ASSIGNOR OF ONE-HALF TO A. J. DELLENBERGER.

TIRE.

1,414,544.  Specification of Letters Patent.  Patented May 2, 1922.

Application filed February 6, 1920. Serial No. 356,604.

*To all whom it may concern:*

Be it known that I, FRANK E. BESSLER, a citizen of the United States, residing at Akron, in the county of Summit and State of Ohio, have invented a new and useful Tire, of which the following is a specification.

The device forming the subject matter of this application is a tire, and one object of the invention is to provide a tire in which the pneumatic elements, subject to puncture and deterioration may be dispensed with.

Another object of the invention is so to construct the tire that the same will have the necessary resiliency, combined with a capacity to resist lateral and other distortions.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
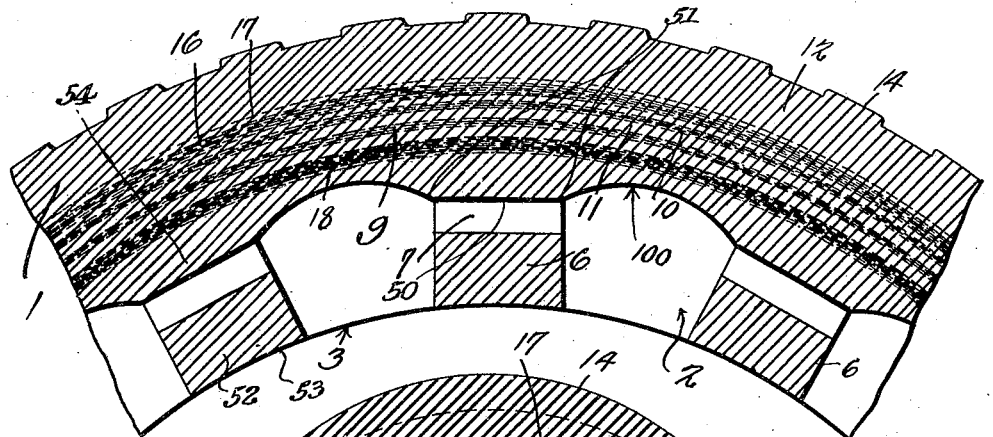
Figure 2:
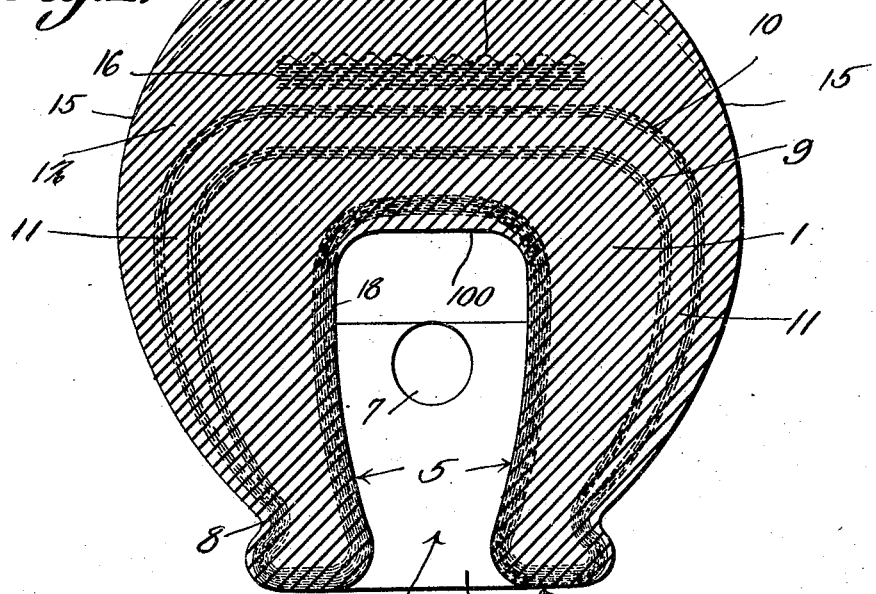

Figure 1 shows in longitudinal section, a portion of a tire constructed in accordance with the invention; and Figure 2 is a cross section.

The tire forming the subject matter of this application includes a body 1 preferably made of rubber and provided with cells 2 which open through the inner surface 3 of the body 1. The cells 2 are defined by blocks or partitions 6. The partitions 6 are made of rubber and, preferably, are made of a more resilient rubber than that out of which the body 1 is made. The partitions 6 are supplied with openings 7 which permit a free passage of the air circumferentially of the tire, and, to some extent, enhance the resiliency of the blocks or partitions. Between the partitions 6, the body 1 is arched circumferentially of the tire, as shown at 100. This arching of the body serves to distribute upon the partitions 6, strains imposed when the tire runs over stones of other irregularities in the highway. The dimension of each cell 2, measured parallel to the median plane of the tire is greater than the dimension of the cell measured at right angles to the said plane, a construction which will be obvious when Figure 2 of the drawings is examined. The cells are defined by side walls 5 which converge toward the inner surface 3 of the body 1.

A lining 18 is secured to the body 1. The lining 18 preferably is made of fabric or duck. The lining 18 branches, as indicated at 8, adjacent to the longitudinal edges of the body 1, to form an inner layer 9 and an outer layer 10, these layers being fashioned from duck or fabric as stated above. A filler 11 preferably made of rubber, is located between the layers 9 and 10 and extends along the sides of the body 1 to points adjacent to the longitudinal edges of the body. On the outer layer 10 a tread 12 is secured, the tread extending along the sides of the tire to points adjacent to the longitudinal edges of the body. Anti-skidding elements 14 of any desired kind may be mounted upon, or constitute a part of the tread 12, the anti-skidding elements and the tread being made of rubber, preferably. The anti-skidding elements 14 extend well down on the sides of the tread 12 as shown at 15, to reinforce, strengthen and protect the tread.

A breaker strip 17 is embedded in the tread 12 and may be corrugated transversely, as shown in Figure 2. Between the breaker strip 17 and the outer layer 10, a belt 16 is located. The belt 16 preferably is made of canvas or some other material which will not stretch. The belt 16 is endless, and since it cannot stretch circumferentially, the tire will be reinforced accordingly. The belt 16 serves to distribute the strain caused when the tire runs over obstacles of any sort, and it prevents a wave-like motion, or dragging action in the tire. The belt strengthens the tire against side blows, and, cooperating with the arched construction indicated at 100, serves as a truss between the blocks or partitions 6. The member 16 being made of non-stretch canvas belting, is to be distinguished clearly, so far as materials of construction are concerned, from the parts 9 and 10 which are made of duck or other fabric.

The general construction of the tire is such that it will possess the necessary stability combined with the desired resiliency. By way of summary, it may be stated that the tire forming the subject matter of this application comprises a body 1 provided with spaced partitions 6 defining cells 2 opening through the inner surface 3 of the body 1, the partitions 6 being joined at their sides and at their outer ends to the body, the body having circumferentially arched surfaces 100 located between the partitions 6. The partitions 6 have circumferential openings 7 which are independent of the body, the outer portions 50 of the openings being disposed at the inner ends 51 of the arched surfaces 100 of the body, the partitions being solid, as indicated at 52 between the openings 7 and the inner surfaces 53 of the partitions, the body being solid, as shown at 54, between the arched surfaces 100.

Having thus described the invention, what is claimed is:—

1. A tire comprising a body provided in its interior with a lining, the lining branching adjacent to the longitudinal edges of the tire to form spaced inner and outer layers, the inner layer surrounding the body transversely; a filler between the layers; a tread superposed on the outer layer; an endless belt of longitudinally inelastic construction embedded in the tread; and partitions within the body and separating the same into cells, the partitions being secured to the lining, and the body being outwardly arched, circumferentially, between the partitions.

2. A tire comprising a body provided with spaced partitions defining cells opening through the inner surface of the body, the partitions being joined at their sides and at their outer ends to the body, the body having circumferential arched surfaces located between the partitions, the partitions having circumferential openings which are independent of the body, the outer portions of the openings being disposed at the inner ends of the arched surfaces of the body, the partitions being solid between the openings and the inner surfaces thereof, and the body being solid between said arched surfaces.

3. A tire comprising a body provided with spaced partitions defining cells opening through the inner surface of the body, the partitions being joined at their sides and at their outer ends to the body, the body being outwardly curved, circumferentially, from partition to partition, upon a curve of such shape as to produce the effect of an arch; and a longitudinally inelastic belt disposed circumferentially of the body and located sufficiently close to the arches, to reinforce the same.

In testimony that I claim the foregoing as my own, I have hereto affixed my signature in the presence of two witnesses.

FRANK E. BESSLER.

Witnesses:
IRENE CHEYNEY,
C. BLAKE MCDOWELL.